United States Patent
Uchimura (10) Patent No.: US 10,180,334 B2
(45) Date of Patent: Jan. 15, 2019

(54) ONBOARD INFORMATION SYSTEM

(71) Applicant: NEC Corporation, Tokyo (JP)

(72) Inventor: Jun Uchimura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 122 days.

(21) Appl. No.: 14/386,522

(22) PCT Filed: Mar. 8, 2013

(86) PCT No.: PCT/JP2013/057323
§ 371 (c)(1),
(2) Date: Sep. 19, 2014

(87) PCT Pub. No.: WO2013/141142
PCT Pub. Date: Sep. 26, 2013

(65) Prior Publication Data
US 2015/0057872 A1    Feb. 26, 2015

(30) Foreign Application Priority Data
Mar. 19, 2012    (JP) ................ 2012-061523

(51) Int. Cl.
*G01C 21/36* (2006.01)
*H04M 1/725* (2006.01)
(Continued)

(52) U.S. Cl.
CPC ..... *G01C 21/3688* (2013.01); *G06F 3/03547* (2013.01); *H04M 1/6075* (2013.01);
(Continued)

(58) Field of Classification Search
CPC .......... G01C 21/3688; H04M 1/72533; H04M 1/72569; H04M 1/72527; H04M 1/6075;
(Continued)

(56) References Cited

U.S. PATENT DOCUMENTS

| | | | |
|---|---|---|---|
| 8,177,182 B1 * | 5/2012 | Wood | G06F 3/0338 248/230.2 |
| 8,793,050 B2 | 7/2014 | Weinmann et al. | |

(Continued)

FOREIGN PATENT DOCUMENTS

| | | |
|---|---|---|
| AU | 2012100011 | 2/2012 |
| DE | 102008007388 | 8/2009 |

(Continued)

OTHER PUBLICATIONS

Wikipedia article, Docking Stations, printed Feb. 6, 2016.*

(Continued)

*Primary Examiner* — Alan D Hutchinson
(74) *Attorney, Agent, or Firm* — Young & Thompson (57) ABSTRACT

Provided is a technology for solving a problem of a high cost due to a redundant investment and improving the user's operability. An in-vehicle information system according to one embodiment includes: an in-vehicle information terminal to be mounted in a vehicle; a portable information terminal equipped with a touch panel for providing the in-vehicle information terminal with operation unit and communication unit; the operation unit for enabling a display screen of the in-vehicle information terminal to be operated by operating the touch panel of the portable information terminal when the portable information terminal is connected to the in-vehicle information terminal via an interface; and the communication unit for enabling external communication of the in-vehicle information terminal by using the communication unit of the portable information terminal.

20 Claims, 10 Drawing Sheets

(51) Int. Cl.
   *H04M 1/60* (2006.01)
   *G06F 3/0354* (2013.01)
   *H04M 1/04* (2006.01)

(52) U.S. Cl.
   CPC ..... *H04M 1/7253* (2013.01); *H04M 1/72527* (2013.01); *H04M 1/72533* (2013.01); *H04M 1/72569* (2013.01); *G06F 2203/0383* (2013.01); *H04M 1/04* (2013.01); *H04M 2250/16* (2013.01); *H04M 2250/22* (2013.01)

(58) Field of Classification Search
   CPC .. H04M 1/7253; H04M 1/04; H04M 2250/16; H04M 2250/22; G06F 3/03547; G06F 2203/0383
   See application file for complete search history.

(56) References Cited

U.S. PATENT DOCUMENTS

2011/0257973 A1* 10/2011 Chutorash .......... G01C 21/3661
                                                      704/235
2011/0292282 A1* 12/2011 Isozu ................ H04M 1/72533
                                                      348/563
2012/0245945 A1* 9/2012 Miyauchi ................ G10L 15/06
                                                      704/275

FOREIGN PATENT DOCUMENTS

| JP | 10-276480 | 10/1998 |
| JP | 2010-079715 | 4/2010 |
| JP | 4619882 | 1/2011 |
| JP | 2011-244414 | 12/2011 |
| WO | 2006-125515 | 11/2006 |

OTHER PUBLICATIONS

Extended European search report, dated Dec. 1, 2015; Application No. 13765120.4.

International Search Report, PCT/JP2013/057323, dated Apr. 16, 2013.

* cited by examiner

PHONE CALL IS INCOMING DURING
CONNECTION TO IN-VEHICLE
INFORMATION TERMINAL

FIG. 9 ized through the advancement of a communication technology, and a portable information terminal that can be carried around, such as a smartphone and a tablet terminal, has appeared on the market. The portable information terminal not only transmits and receives e-mails but also has, as its standard function, a browser function of acquiring a document file written in a markup language, such as HTML and XML, from a web server connected to the Internet to view a web page. A majority of such portable information terminals are provided with, in addition to a button input function, touch panel means for enabling an input operation to be performed by, for example, touching the screen with his/her finger.

ONBOARD INFORMATION SYSTEM

TECHNICAL FIELD

This invention relates to an in-vehicle information system (in other words, onboard_ information system) in which an in-vehicle information terminal to be mounted in a vehicle and a portable information terminal that can be freely carried around are connected to each other.

BACKGROUND ART

In recent years, an information terminal has been multi-functionalized through the advancement of a communication technology, and a portable information terminal that can be carried around, such as a smartphone and a tablet terminal, has appeared on the market. The portable information terminal not only transmits and receives e-mails but also has, as its standard function, a browser function of acquiring a document file written in a markup language, such as HTML and XML, from a web server connected to the Internet to view a web page. A majority of such portable information terminals are provided with, in addition to a button input function, touch panel means for enabling an input operation to be performed by, for example, touching the screen with his/her finger.

Also in an in-vehicle information terminal, such as a car navigation system mounted in an automobile, in-vehicle information terminals for enabling, in addition to conventional route search and television watching functions, collection of various types of information, such as transmission and reception of e-mails, viewing of a home page, and electronic commerce which use the Internet communication, have come into the market.

Incidentally, most of the users who own the automobile also own, along with the in-vehicle information terminal mounted in the automobile, a portable information terminal having a function of transmitting and receiving data by wireless communication. In order to use the Internet communication on the in-vehicle information terminal, the communication function is necessary to add functions of Internet access, acquisition of the latest information, and e-mails. However, paying communication expenses only for the in-vehicle information terminal, such as a car navigation system, by the user is difficult because a high cost is required.

Accordingly, many users have come to adopt a method involving connecting his/her own portable information terminal and in-vehicle information terminal to each other via an interface, such as a wireless LAN, Bluetooth (trademark), and a cable, to provide the in-vehicle information terminal with the communication function with use of the communication function of the portable information terminal.

There are known several patent documents disclosing technologies relating to such communication system for communication among a plurality of devices.

For example, in Patent Document 1, there is disclosed a configuration in which a mobile phone is connected to an information device, screen information to be displayed on the information device is displayed on a display device of the mobile phone, and the information device is remotely operated via a network. The mobile phone of Patent Document 1 provides a technology capable of remotely operating the information device with a high level of operability with use of operation buttons of the mobile phone.

Further, in Patent Document 2, there is disclosed an example of a system in which a portable device is connected to a display device to make use of a communication function of the portable device. The display device of Patent Document 2 has an object to make use of the communication function of the portable device without a user operating in hand the portable device connected via an interface.

PRIOR ART DOCUMENTS

Patent Documents

Patent Document 1: JP-B2-4619882
Patent Document 2: JP-A-2011-244414

DISCLOSURE OF THE INVENTION

Problems to be Solved by the Invention

However, in each of the above-mentioned patent documents, a configuration in which two devices are used to display information is adopted, and hence there exist two display screens. As a result, the user needs to view both screens as appropriate, which is complicated for the user, and hence the user's attention may be undesirably distracted.

In a case where both of the portable information terminal and the in-vehicle information terminal are provided with touch panels, a cost to be paid by the user may be undesirably increased because a display that can be used as a touch panel is expensive. In this case, the user needs to make a redundant investment on devices of the same type, which is not efficient.

In order to solve the above-mentioned problems, this invention has an object to provide an in-vehicle information system including a portable information terminal for providing an in-vehicle information terminal to be mounted in a vehicle with simple operation means and an external communication function.

Means to Solve the Problems

In view of the above-mentioned problems, according to one aspect of this invention, there is provided an in-vehicle information system, including: an in-vehicle information terminal to be mounted in a vehicle; a portable information terminal equipped with a touch panel for providing the in-vehicle information terminal with operation unit and communication unit; the operation unit for enabling a display screen of the in-vehicle information terminal to be operated by operating the touch panel of the portable information terminal when the portable information terminal is connected to the in-vehicle information terminal via an interface; and the communication unit for enabling external communication of the in-vehicle information terminal by using the communication unit of the portable information terminal.

Effect of the Invention

According to one embodiment of this invention, it is possible to enhance the usefulness by unifying the display screens for displaying various types of information, and it is also possible to enhance the user's operability.

Further advantages and embodiments of this invention are described in detail in the following by way of description and with reference to the drawings.

MODES FOR EMBODYING THE INVENTION

Now, a description is given of an in-vehicle information system 1 according to preferred embodiments of this invention with reference to the drawings. Note that, the technical scope of this invention is by no means interpreted in a limitative manner by the embodiments to be described below.

First Embodiment

First, a description is given of an in-vehicle information system 1 according to a first embodiment of this invention with reference to the drawings. In this embodiment, an in-vehicle information terminal 100 and a portable information terminal 200 are connected to each other and a touch panel 201 (operation unit) of the portable information terminal 200 is operated, to thereby realize control and operation of a display screen 101 on the in-vehicle information terminal 100.

Figure 1:
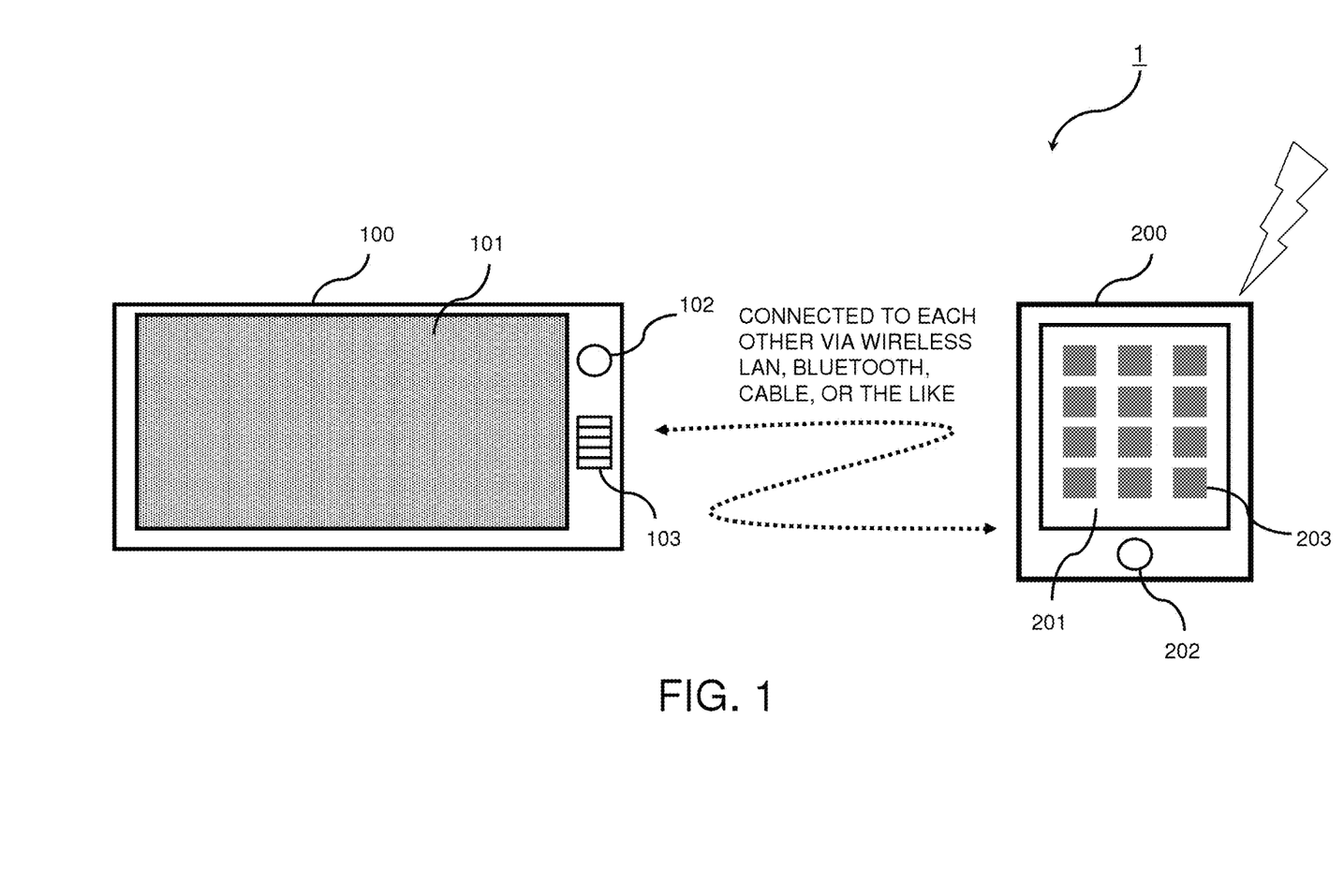
FIG. 1 is a diagram illustrating an in-vehicle information system in which an in-vehicle information terminal and a portable information terminal are connected to each other according to a first embodiment of this invention.

FIG. 1 is a schematic diagram illustrating a specific configuration of the in-vehicle information system 1 according to the first embodiment of this invention. The in-vehicle information system 1 according to this embodiment includes: the in-vehicle information terminal 100 including the display screen 101, a confirmation button 102, and operation buttons 103; and the portable information terminal 200 including the touch panel 201 and a home button 202. In addition, icons 203 are displayed on the display of the touch panel 201.

In the illustrated example, the in-vehicle information terminal 100 is a car navigation system, such as carrozzeria, and the portable information terminal 200 is a smartphone, such as iPhone (trademark). This invention is, however, not limited to this specific example. For example, a device having a relatively large display, such as a tablet terminal, may be used as the in-vehicle information terminal 100, and any type of device may be used as the portable information terminal 200 as long as the device to be used is equipped with a touch panel, such as a game machine, a PDA, and a tablet terminal.

The in-vehicle information terminal 100 may include a positioning device, such as the GPS, and executes calculation of a route from a departure place to a destination when a route search is executed to display the calculated route result on the display screen 101. As is widely known, here, a device with the GPS only receives information and does not transmit information, and hence the GPS differs from the Internet communication, which is available for use in this invention.

On the in-vehicle information terminal 100, the display screen 101 realizes a function of displaying various types of information, such as displaying of information on a route to a destination, displaying of information on a current location, and viewing of a home page. In addition, the confirmation button 102 realizes an operation function, such as returning of the display screen 101 to a default one and reading of a received e-mail, and further, the operation buttons 103 realize a selection function, such as selection of contents and selection of a phone number. For example, when a user desires to acquire information on a route to a destination, the user uses one of the operation buttons 103 of the in-vehicle information terminal 100 to enter the destination, and the in-vehicle information terminal 100 calculates the route based on the entered information, such as the destination, under the control of a route search program and the like and displays calculated route candidates on the display screen 101. When the user selects a desired route from among the route candidates with use of the confirmation button 102, route guidance processing is executed. Note that, the in-vehicle information terminal 100 of this invention does not have a function of enabling a touch input.

On the portable information terminal 200, various contents are displayed on the touch panel 201, which is, for example, an LCD panel. When one of the icons 203 included in an image for a GUI is selected based on an input made by the user to the touch panel, a dedicated application specified by the selected one of the icons 203 is executed. To end the application, the user pushes the home button 202.

On the portable information terminal 200, transmission and reception of a radio signal compliant with the Internet Protocol are realized by various communication schemes. For example, the portable information terminal 200 performs communication by the third generation mobile communication, such as the CDMA scheme.

The in-vehicle information terminal 100 and the portable information terminal 200 are connected to each other via a wired or wireless interface, and are connected to each other via, for example, an interface, such as a wireless LAN, Bluetooth (trademark), infrared communication, and a cable, to transmit or receive a radio signal.

In the in-vehicle information system 1 of this embodiment, the in-vehicle information terminal 100 and the portable information terminal 200 are connected to each other so that, in addition to an operation using the confirmation button 102 or the operation buttons 103, the touch panel 201 of the portable information terminal 200 is operated to realize selection of contents, selection of a phone number, and the like.

Figure 2:
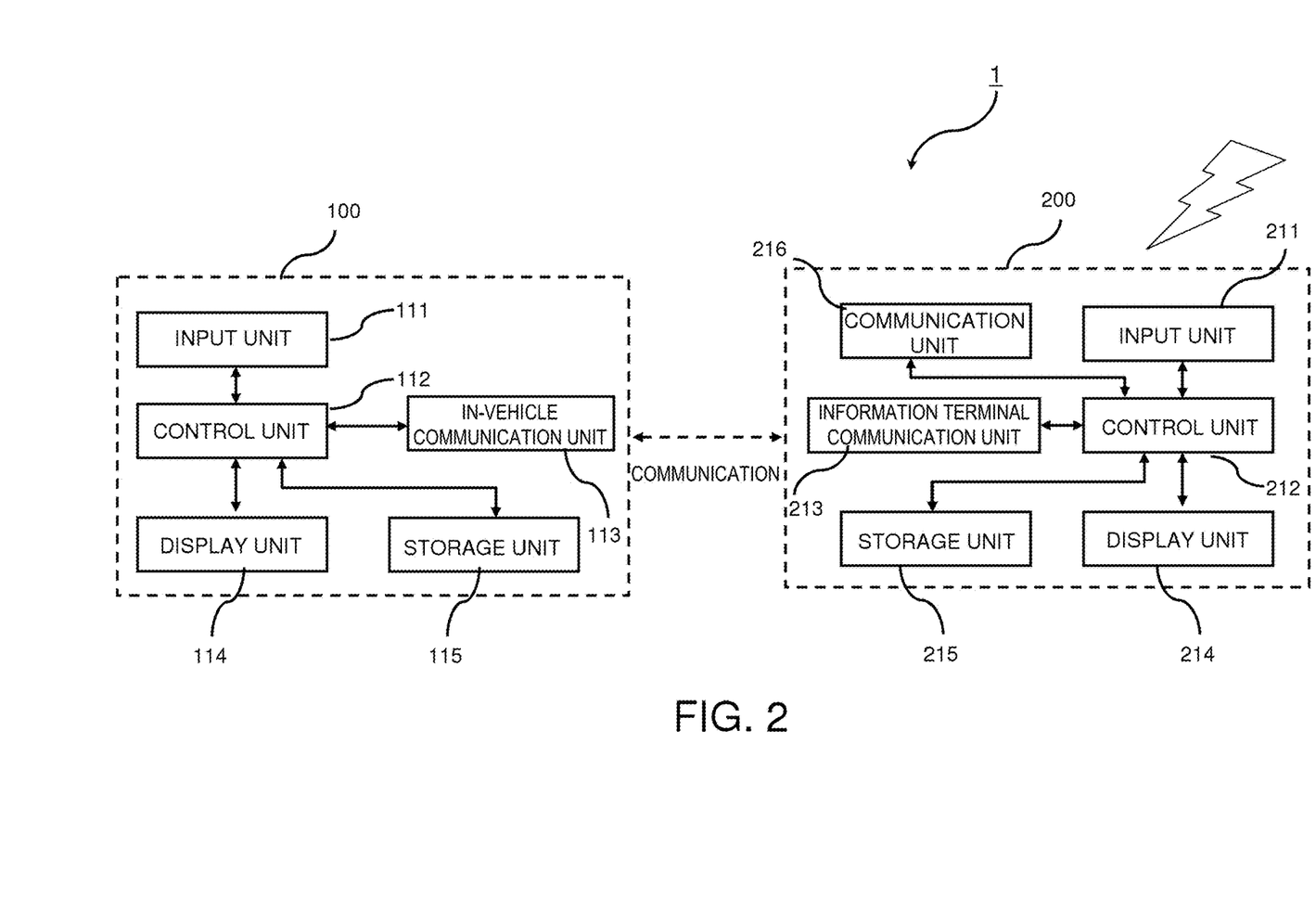
FIG. 2 is a functional block diagram illustrating schematic functions of the in-vehicle information terminal and the portable information terminal according to the first embodiment of this invention.

FIG. 2 is a functional block diagram illustrating schematic functions of the in-vehicle information system 1 illustrated in FIG. 1. As illustrated in FIG. 2, the in-vehicle information terminal 100 according to this embodiment includes an input unit 111, a control unit 112, an in-vehicle communication unit 113, a display unit 114, and a storage unit 115, and the portable information terminal 200 according to this embodiment includes an input unit 211, a control unit 212, an information terminal communication unit 213, a display unit 214, a storage unit 215, and a communication unit 216.

On the in-vehicle information terminal 100, when information, such as a destination and a phone number, is input from the input unit 111 or the input unit 211, the control unit 112 displays the input information on the display unit 114 in a visible manner, and uses a route map and a route search program stored in the storage unit 115 to calculate route candidates. The calculated route candidates are displayed on the display unit 114. When the in-vehicle information terminal 100 and the portable information terminal 200 are connected to each other via an interface, the in-vehicle communication unit 113 and the information terminal communication unit 213 executes wired or wireless communication.

In this embodiment, when one of the icons 203 displayed on the display unit 214 of the portable information terminal 200 is pressed to activate a dedicated application, the in-vehicle communication unit 113 of the in-vehicle information terminal 100 and the information terminal communication unit 213 of the portable information terminal 200 are connected to each other via the wireless LAN. When information on this connection is transmitted from the information terminal communication unit 213 to the control unit 212, the control unit 212 transmits to the display unit 214 an instruction to switch its screen display and also extracts a display screen for switching stored in the storage unit 215 to display the display screen for switching on the display unit 214. When the user makes a touch input to the input unit 211, information on this touch input is transmitted by the control unit 212 to the in-vehicle communication unit 113 of the in-vehicle information terminal 100 via the information terminal communication unit 213. The above-mentioned connection may be realized with use of the cable.

When Internet access or the like is to be made on the in-vehicle information terminal 100, an instruction is transmitted from the in-vehicle communication unit 113 of the in-vehicle information terminal 100 to the information terminal communication unit 213 of the portable information terminal 200 so that the in-vehicle information terminal 100 can perform communication to/from an outside with use of the communication unit 216 of the portable information terminal 200 via the control unit 212.

Next, a description is given of an operation of the in-vehicle information system 1 according to the first embodiment of this invention.

Figure 3:
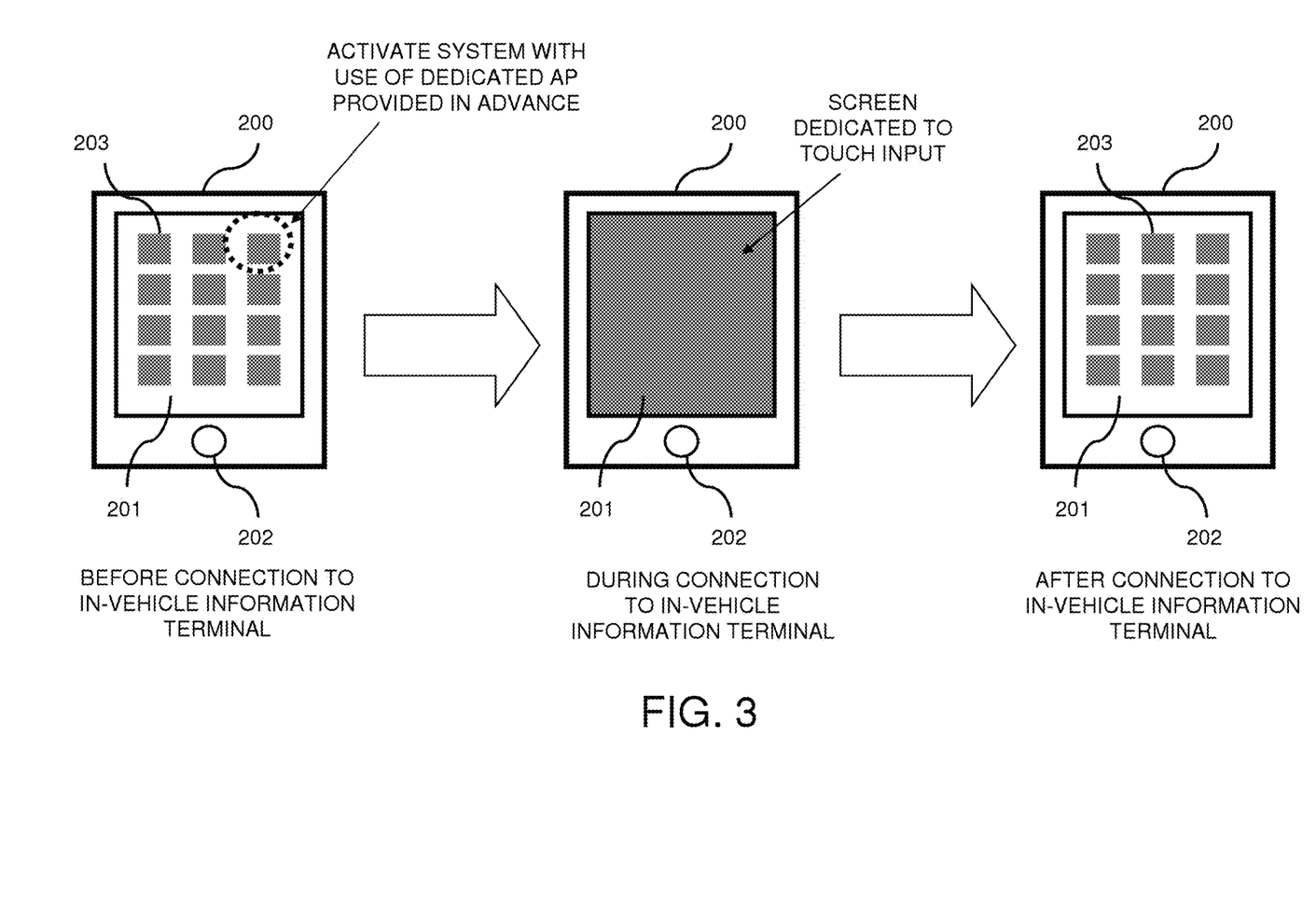
FIG. 3 is a diagram illustrating an example of screen transitions of the portable information terminal illustrated in FIG. 1.
Figure 4:
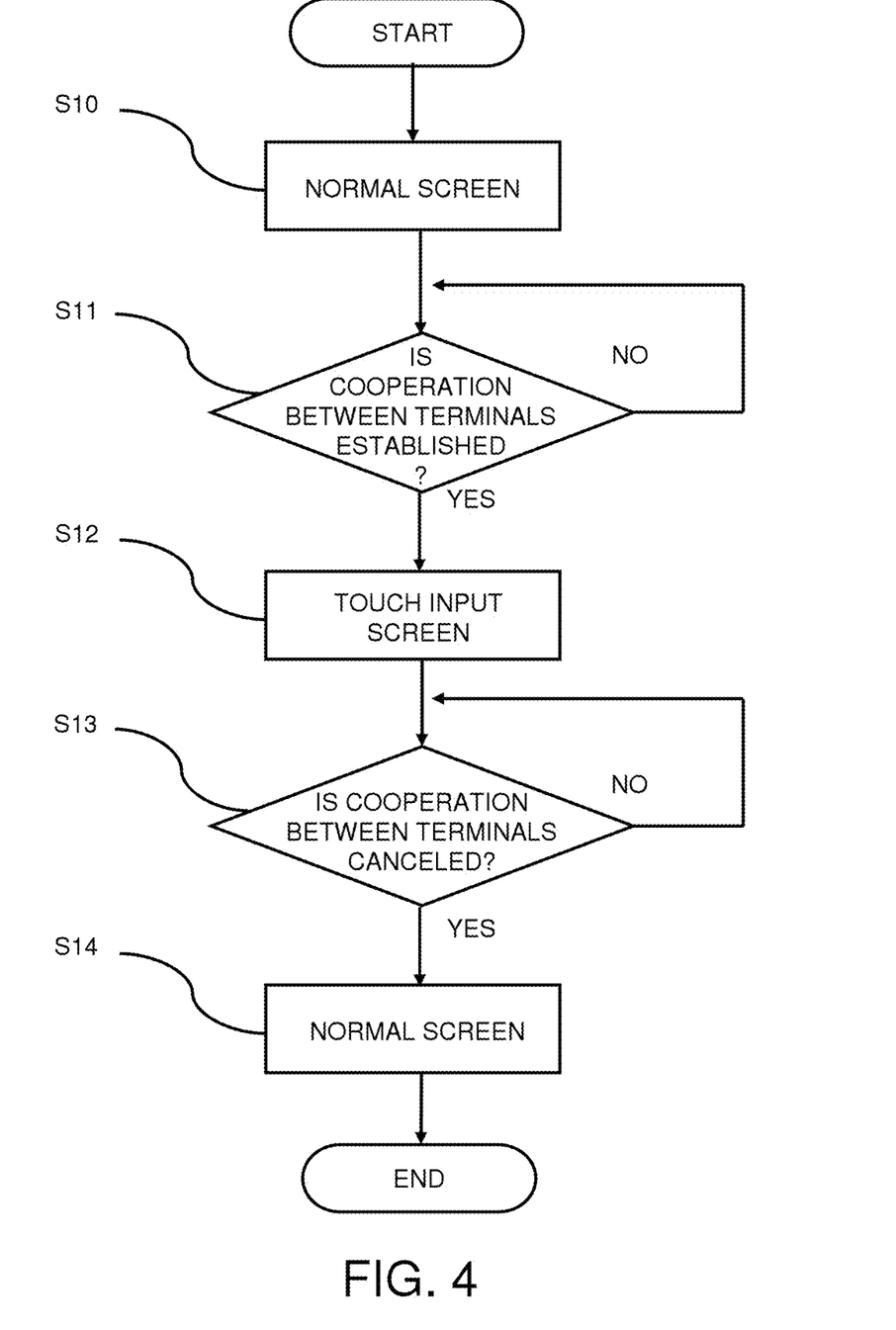
FIG. 4 is a flow chart illustrating screen processing of the portable information terminal illustrated in FIG. 3.

FIG. 3 is a diagram illustrating an example of screen transitions of the portable information terminal 200 illustrated in FIG. 1. FIG. 4 is a flow chart illustrating screen processing of the portable information terminal 200 in the in-vehicle information system 1 of this embodiment.

As illustrated in FIG. 3, the portable information terminal 200 displays a normal screen before its connection to the in-vehicle information terminal 100. In other words, on the touch panel 201, the normal screen on which the plurality of icons 203 are arranged in advance is displayed (S10). The portable information terminal 200 next determines whether or not cooperation with the in-vehicle information terminal 100 is established (S11), and when the cooperation is not established (NO in S11), does not change the screen of the touch panel 201 from its normal screen. For example, when the in-vehicle information terminal 100 and the portable information terminal 200 are connected to each other with the cable or when a specific one of the plurality of icons 203 of the touch panel 201 is selected to activate the system with use of the dedicated application, the cooperation between the in-vehicle information terminal 100 and the portable information terminal 200 is established (YES in S11). In this case, the portable information terminal 200 switches the screen of the touch panel 201 to display a screen dedicated to a touch input (S12). While the in-vehicle information terminal 100 and the portable information terminal 200 are connected to each other, various types of processing are performed while this screen display is kept as it is. Next, the portable information terminal 200 determines whether or not the cooperation with the in-vehicle information terminal 100 is canceled (S13), and when the cooperation is not canceled (NO in S13), does not change the screen of the touch panel 201 from its screen dedicated to the touch input. When the connection by the cable is canceled or when the dedicated application is finished, the cooperation between both of the information terminals 100 and 200 is canceled (YES in S13). In this case, the portable information terminal 200 switches the screen of the touch panel 201 to display the original normal screen (S14).

Figure 5:
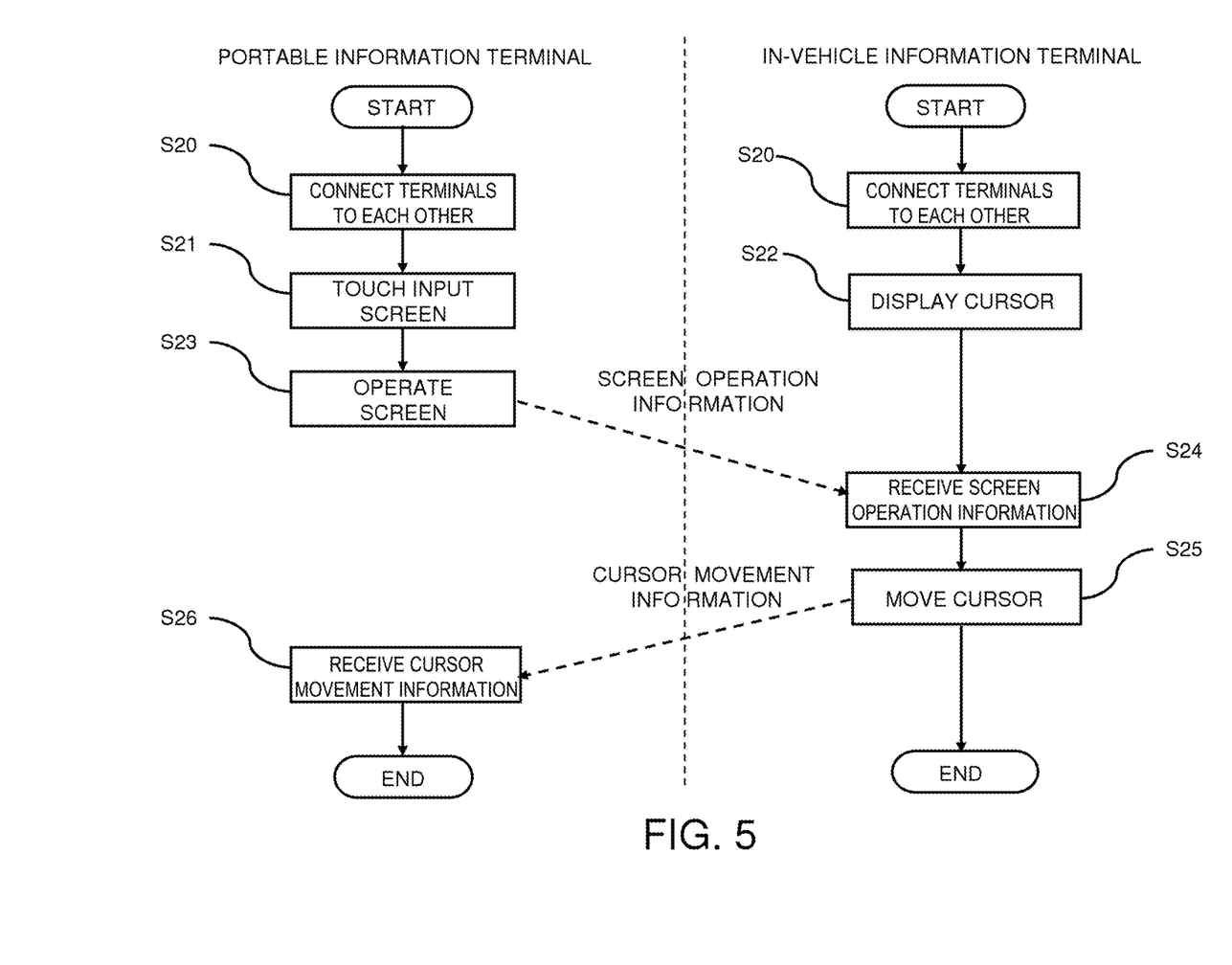
FIG. 5 is a flow chart illustrating specific operation processing performed in the in-vehicle information system according to the first embodiment of this invention.

FIG. 5 is a flow chart illustrating specific operation processing performed in the in-vehicle information system 1 according to the first embodiment of this invention.

When the in-vehicle information terminal 100 and the portable information terminal 200 are connected to each other via the interface in a wired or wireless manner (S20), the portable information terminal 200 displays the touch input screen on its touch panel 201 (S21). Further, the in-vehicle information terminal 100 displays a cursor on a predetermined position of the display screen 101 (S22). Next, when the user touches and operates the touch input screen of the portable information terminal 200 with his/her finger or the like (S23), the control unit 212 transmits via the information terminal communication unit 213 screen operation information to the in-vehicle communication unit 113 of the in-vehicle information terminal 100. The in-vehicle information terminal 100 receives this screen operation information (S24), and moves the cursor displayed on the display screen 101 in accordance with the received operation information (S25). Based on the operation information, the in-vehicle information terminal 100 may also, for example, select a specific application displayed on the display screen 101 of the in-vehicle information terminal 100 or scroll the screen. Then, the movement information on the cursor is transmitted to the portable information terminal 100 via the in-vehicle communication unit 113 (S26).

Figure 6:
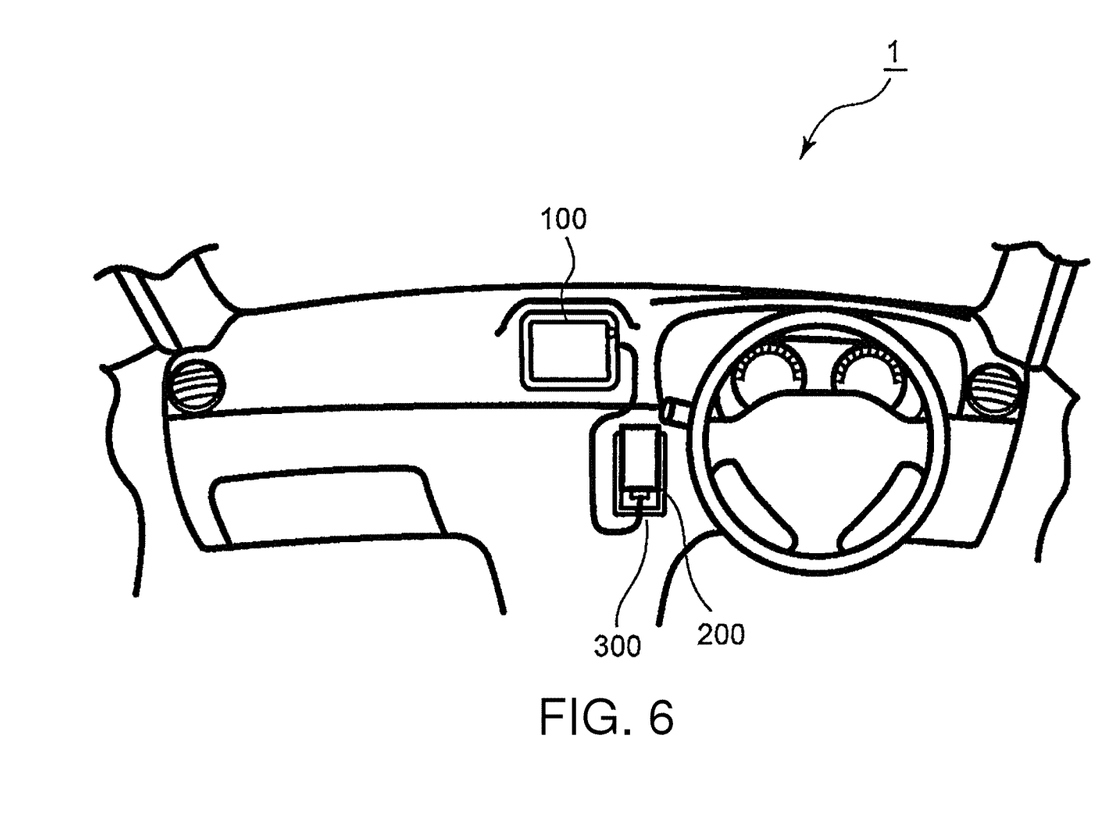
FIG. 6 is a diagram illustrating an example in which the in-vehicle information terminal and the portable information terminal are arranged in a vehicle in the in-vehicle information system according to the first embodiment of this invention.

FIG. 6 is a diagram illustrating a configuration in which the in-vehicle information system 1 according to this embodiment is arranged in a vehicle. In FIG. 6, the portable information terminal 200 is connected to the in-vehicle information terminal 100 with use of the cable through a holder 300. In FIG. 6, the in-vehicle information terminal 100 is fitted to an upper part of the center of the dashboard of an automobile and the holder 300 is arranged on a lower side, that is, on a driver's seat side. The portable information terminal 200 is accommodated into the holder 300. In this embodiment, a connector is arranged inside the holder 300, and through this connector, the holder 300 and the in-vehicle information terminal 100 are connected to each other with the cable. Accordingly, the portable information terminal 200 is accommodated into the holder 300 and the connector is inserted into a Dock terminal of the portable information terminal 200 so that the connection between the in-vehicle information terminal 100 and the portable information terminal 200 can be established. It should be understood that how to connect the information terminals 100 and 200 to each other and how to connect the information terminals 100 and 200 and the holder 300 to one another are not limited to the examples described above, and the information terminals 100 and 200 may be connected to each other by a wireless connection method.

This configuration enables the driver of the vehicle to operate the touch input screen displayed on the touch panel 201 of the portable information terminal 200 to transmit or receive an e-mail, search for a Web page, and view information contents such as viewing of a video, on the in-vehicle information terminal 100.

According to the first embodiment of this invention described above, effects to be described below are achieved.

A first effect is that the operability of the in-vehicle information terminal 100 can be enhanced. This effect is achieved because the portable information terminal 200 can be used as an external mousepad for the in-vehicle information terminal 100.

A second effect is that the cost of the entire system can be reduced in the in-vehicle information system 1. This effect is achieved because the portable information terminal 200 equipped with a touch panel is connected to the in-vehicle information terminal 100 having a normal screen.

A third effect is that various types of processing, such as transmission/reception of an e-mail, viewing of a Web page, and electronic commerce, can be performed on the in-vehicle information terminal 100. This effect is achieved because the in-vehicle information system 1 has the configuration in which the portable information terminal 200 is connected to the in-vehicle information terminal 100 so that the external communication function of the portable information terminal 200 is provided to the in-vehicle information terminal 100.

Second Embodiment

Next, a description is given of a second embodiment of this invention. The second embodiment of this invention is a modification example of the first embodiment described above. In the following, in this embodiment, parts having the same functions as those of the parts described above in the first embodiment are denoted by the same reference numerals and their descriptions are omitted.

Figure 7:
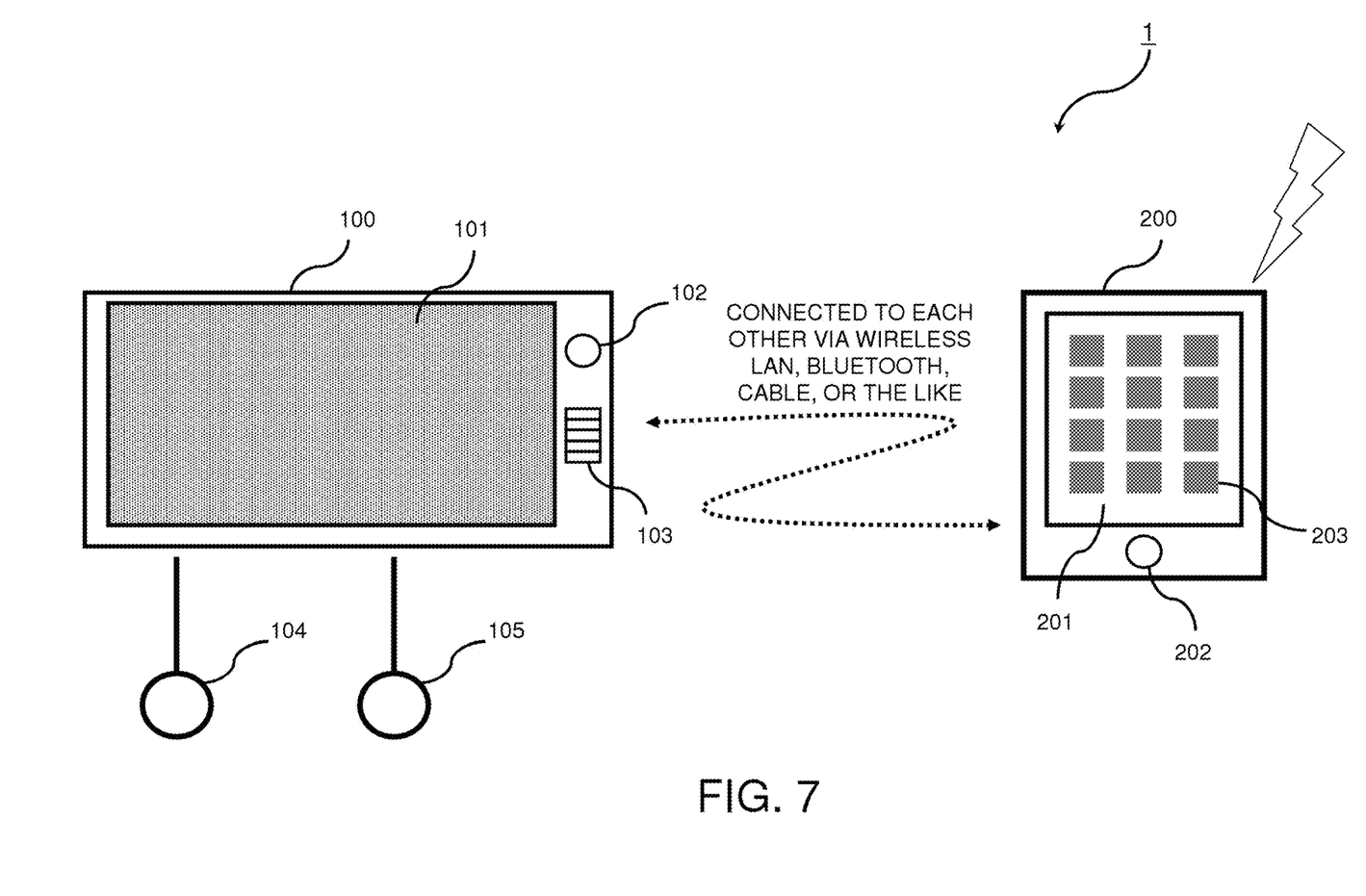
FIG. 7 is a diagram illustrating an in-vehicle information system in which the in-vehicle information terminal and the portable information terminal are connected to each other according to a second embodiment of this invention.

FIG. 7 is a diagram illustrating an in-vehicle information system 1 according to the second embodiment of this invention. In this embodiment, an in-vehicle microphone 104 and an in-vehicle speaker 105 are connected to the in-vehicle information terminal 100 in such a manner that the in-vehicle microphone 104 and the in-vehicle speaker 105 can establish communication to/from the in-vehicle information terminal 100.

It is preferred that the in-vehicle microphone 104 be provided to a steering wheel or an inner wall of a door in order to effectively collect a sound of a conversation of a driver or others. The in-vehicle microphone 104 can be used to operate the in-vehicle information terminal 100 by voice. The in-vehicle speaker 105 is, for example, a flat speaker, and is embedded into a ceiling surface of the interior, a front door on the driver's seat side, or the like to reproduce a voice of the other person on the phone.

Figure 8:
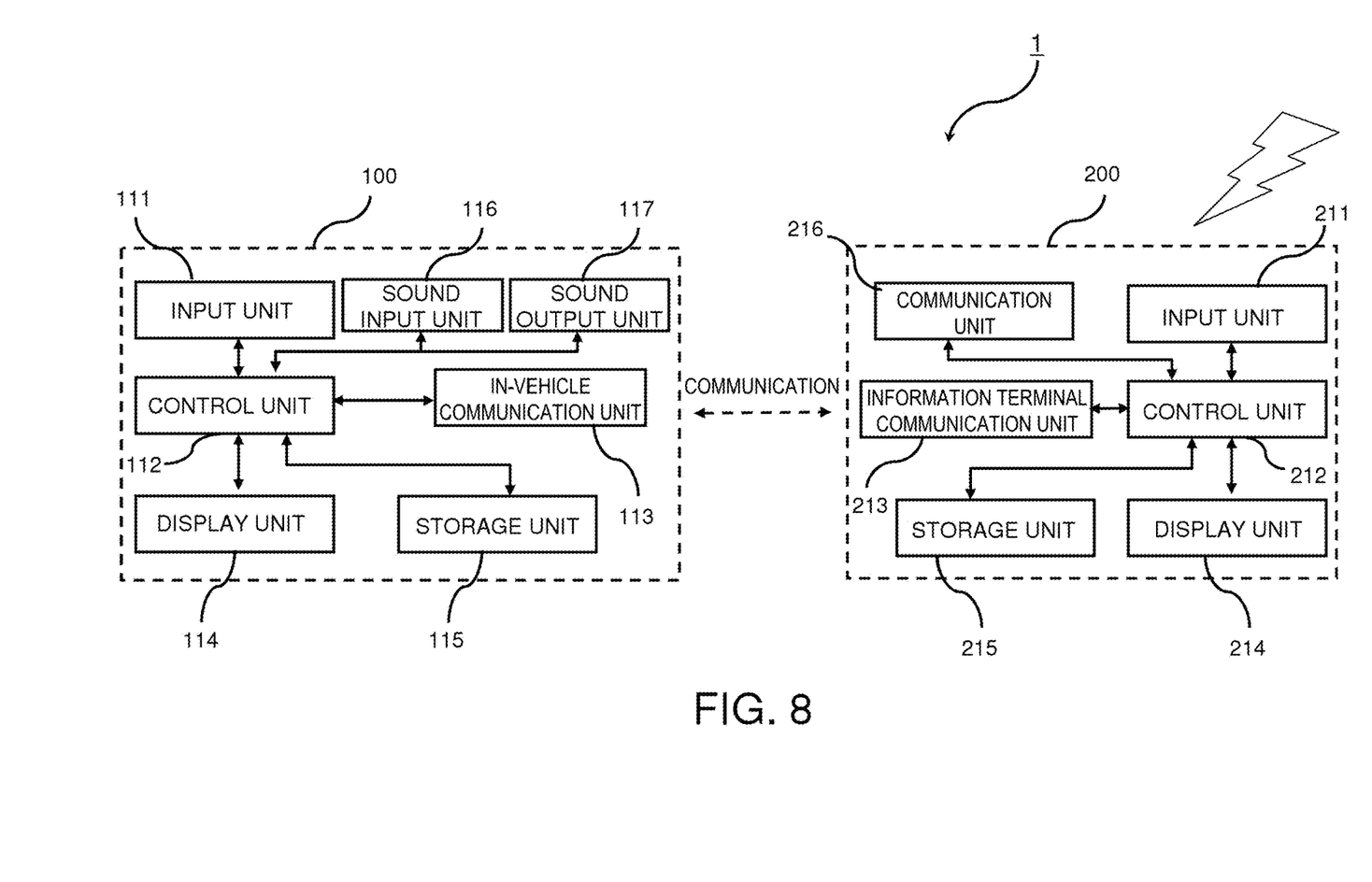
FIG. 8 is a functional block diagram illustrating schematic functions of the in-vehicle information terminal and the portable information terminal according to the second embodiment of this invention.

FIG. 8 is a functional block diagram illustrating schematic functions of the in-vehicle information system 1 illustrated in FIG. 7. In this embodiment, in addition to the components described above in the first embodiment, the in-vehicle information terminal 100 further includes a sound input unit 116 and a sound output unit 117.

On the in-vehicle information terminal 100, when the sound input unit 116 receives the sound of the conversation of the driver or others, the control unit 112 transmits via the in-vehicle communication unit 113 information on the received sound to the information terminal communication unit 213 of the portable information terminal 200. On the portable information terminal 200, the sound information received by the information terminal communication unit 213 is transmitted to the communication unit 216 to perform phone call processing. When the communication unit 216 receives sound information from a calling party, the control unit 212 transmits via the information terminal communication unit 213 the sound information to the in-vehicle communication unit 113 of the in-vehicle information terminal 100. On the in-vehicle information terminal 100, the sound information on the calling party received by the in-vehicle communication unit 113 is output by the sound output unit 117. With this configuration, it is possible to perform substantial phone call processing on the in-vehicle information terminal 100 side. It is further possible to build a hands-free in-vehicle information system 1 in the vehicle.

Figure 9:
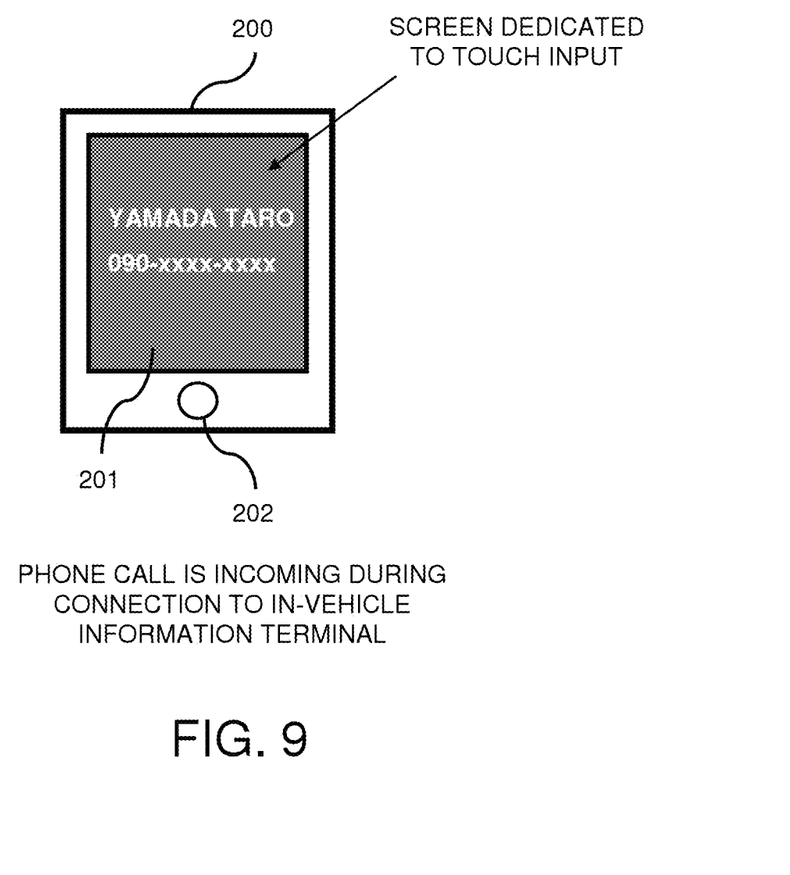
FIG. 9 is a diagram illustrating screen processing performed when a phone call is incoming during the operation of the system of FIG. 7.
Figure 10:
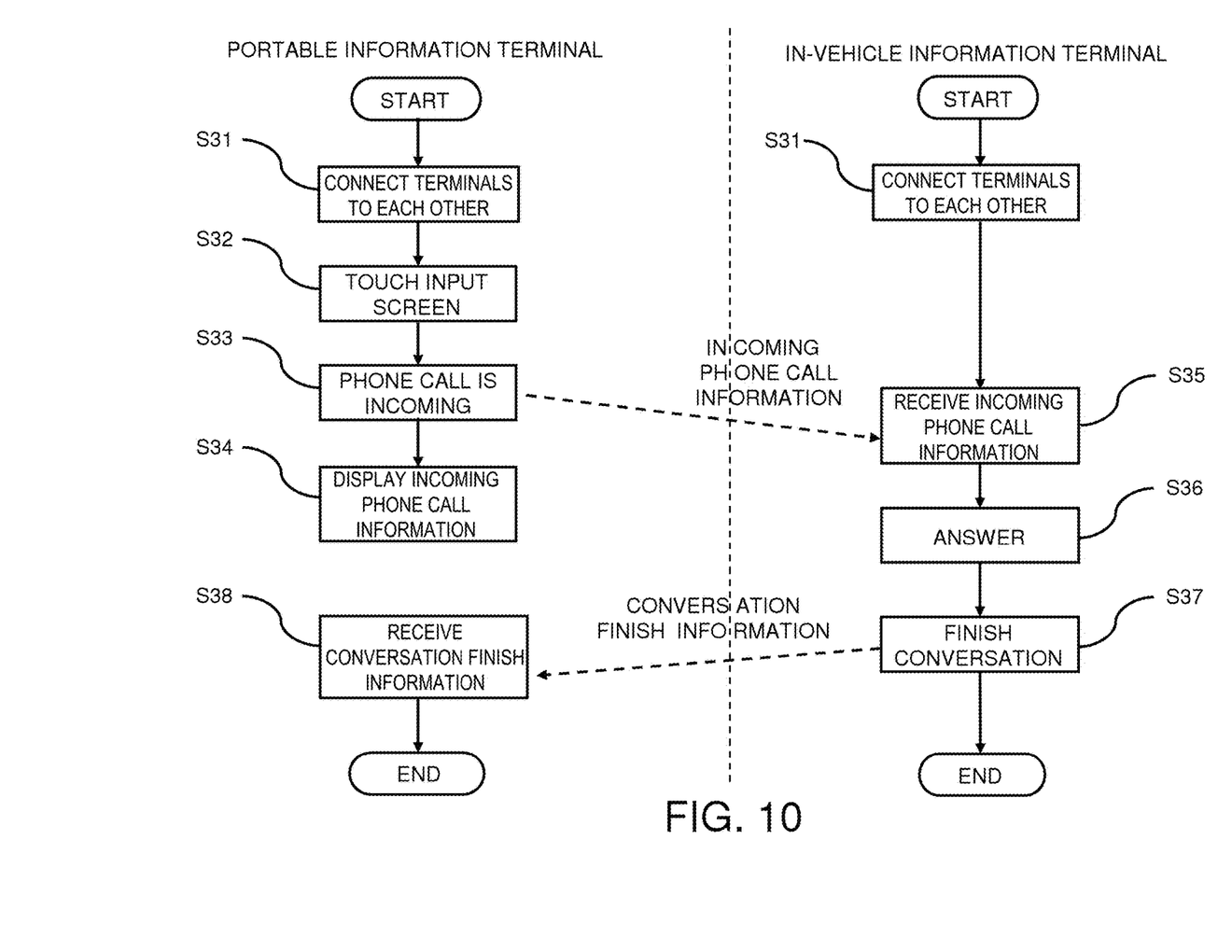
FIG. 10 is a flow chart illustrating specific processing for an incoming phone call performed in the in-vehicle information system according to the second embodiment of this invention.

FIG. 9 is a diagram illustrating a screen display of the touch panel 201 displayed when a phone call is incoming to the portable information terminal 200 in the in-vehicle information system 1 illustrated in FIG. 7. FIG. 10 is a flow chart illustrating specific processing for an incoming phone call performed when a phone call is incoming during the operation of the system.

In FIG. 9, in addition to the functions described above in the first embodiment, a phone call function of the portable information terminal 200 is used to make a phone call on the in-vehicle information terminal 100 with use of the sound input unit 116 and the sound output unit 117.

In the in-vehicle information system 1 according to this embodiment, when the connection between the in-vehicle information terminal 100 and the portable information terminal 200 via the interface is established (S31), the touch input screen is displayed on the touch panel 201 of the portable information terminal 200 (S32). When a phone call is incoming to the portable information terminal 200 while the touch input screen is displayed (S33), incoming phone call information, such as the one illustrated in FIG. 9 including the name and phone number of the calling party, is displayed on the screen of the touch panel 201 (S34). Further, the incoming phone call information is transmitted from the portable information terminal 200 to the in-vehicle information terminal 100 (S35), and the user can answer the incoming phone call by operating the touch panel 201 of the portable information terminal 200, the operation buttons 103 of the in-vehicle information terminal 100, or the like (S36). The user can finish a conversation by similarly operating the touch panel 201, the operation buttons 103, or the like (S37). Information on this finish of the conversation is transmitted from the in-vehicle information terminal 100 to the portable information terminal 200, and the portable information terminal 200 receives the conversation finish information to perform predetermined processing, thereby ending the phone call processing (S38).

When making a phone call from the user of the portable information terminal 200, the user can use an application or the like provided in advance to the in-vehicle information terminal 100 to input information on a called party. To input the information on the called party, the user can select a name and phone number of the called party from a database of the names and phone numbers, which are registered in advance in the storage unit 115, or can use the confirmation button 102 or the operation buttons 103, or the like to directly input the information on the called party. On the touch panel 201 of the portable information terminal 200, the name and phone number of the other person on the phone are displayed with use of the information stored in the storage unit 115 of the in-vehicle information terminal 100 or the information stored in the storage unit 215 of the portable information terminal 200.

According to the second embodiment of this invention described above, effects to be described below are achieved.

A first effect is that the phone call processing can be performed on the in-vehicle information terminal 100 side and further, the user can make a hands-free phone call. This effect is achieved because when a phone call is made or a phone call is incoming, the phone call processing is not performed on the portable information terminal 200 but is realized with use of the functions of the in-vehicle information terminal 100.

Note that, this invention is not limited to the embodiments and examples described above. It should be understood that a person skilled in the art could arrive at various modification examples and improvement examples within the scope of this invention, and that those modification examples and improvement examples are included in this invention. For example, communication means of the portable information terminal 200 is used to make a conversation on the in-vehicle information terminal 100 side in this embodiment, but it is also possible to perform operations of making a phone call or answering an incoming call on the in-vehicle information terminal 100 to make a conversation on the portable information terminal 200 side.

REFERENCE SIGNS LIST 1 in-vehicle information system
100 in-vehicle information terminal
101 display screen
102 confirmation button
103 operation button
104 in-vehicle microphone
105 in-vehicle speaker
111 input unit
112 control unit
113 in-vehicle communication unit
114 display unit
115 storage unit
116 sound input unit
117 sound output unit
200 portable information terminal
201 touch panel
202 home button
203 icon
211 input unit
212 control unit
213 information terminal communication unit
214 display unit
215 storage unit
216 communication unit
300 holder This application claims priority from Japanese Patent Application No. 2012-061523, filed on Mar. 19, 2012, the entire disclosure of which is incorporated herein by reference.

The invention claimed is:

1. An in-vehicle information system, comprising:
an in-vehicle information terminal to be mounted in a vehicle, the in-vehicle information terminal including a first display unit having a first display screen that does not have a function enabling a touch input, an in-vehicle communication unit, and a first control unit (112); and
a portable information terminal equipped with a touch panel that serves as a second input unit and a second display unit having a second display screen, the portable information terminal including an information terminal communication unit, a second control unit, and an external communication unit (216),
a combination of the first control unit and the second control unit configured to operate the first display screen of the first display unit of the in-vehicle information terminal by way of a user operation upon the second display screen of the touch panel of the portable information terminal when the information terminal communication unit of the portable information terminal is connected to the in-vehicle communication unit of the in-vehicle information terminal via an interface, and
the combination of the first control unit and the second control unit configured to enable the in-vehicle information terminal to carry out external communication via the external communication unit of the portable information terminal when the information terminal communication unit of the portable information terminal is connected to the in-vehicle communication unit of the in-vehicle information terminal via the interface.

2. The in-vehicle information system according to claim 1, wherein:
the interface for connecting the in-vehicle communication unit of the in-vehicle information terminal and the information terminal communication unit of the portable information terminal to each other comprises a wired or wireless interface; and
the in-vehicle information system is configured to:
stop, when the in-vehicle communication unit of the in-vehicle information terminal and the information terminal communication unit of the portable information terminal are connected to each other, a screen display on the second display screen of the touch panel of the portable information terminal to switch the screen display on the second display screen of the touch panel from a normal screen of the portable information terminal to a screen dedicated to a touch input for the in-vehicle information terminal; and
return, when the connection between the in-vehicle communication unit of the in-vehicle information terminal and the information terminal communication unit of the portable information terminal is canceled, the screen display on the second display screen of the touch panel of the portable information terminal to an original screen display to switch the screen display on the second display screen of the touch panel from the screen dedicated to the touch input for the in-vehicle information terminal to the normal screen of the portable information terminal.

3. The in-vehicle information system according to claim 2, wherein the in-vehicle information system is further configured to:
display, when the in-vehicle communication unit of the in-vehicle information terminal and the information terminal communication unit of the portable information terminal are connected to each other, a cursor on the first display screen of the first display unit of the in-vehicle information terminal;

display, to a user, a current position pointed on the first display screen of the first display unit by a touch input to the second display screen on the touch panel of the portable information terminal; and move the cursor on the first display screen in response to the touch input to the second display screen on the touch panel of the portable information terminal.

4. The in-vehicle information system according to claim 3, wherein:

the in-vehicle information terminal further comprises a microphone and a speaker; and the in-vehicle information system is further configured to make, when an incoming phone call interrupts under a state in which the in-vehicle communication unit of the in-vehicle information terminal and the information terminal communication unit of the portable information terminal are connected to each other, a phone call on the in-vehicle information terminal side while avoiding changing display of the portable information terminal or only performing minimal display.

5. The in-vehicle information system according to claim 2, wherein:

the in-vehicle information terminal further comprises a microphone and a speaker; and the in-vehicle information system is further configured to make, when an incoming phone call interrupts under a state in which the in-vehicle communication unit of the in-vehicle information terminal and the information terminal communication unit of the portable information terminal are connected to each other, a phone call on the in-vehicle information terminal side while avoiding changing display of the portable information terminal or only performing minimal display.

6. The in-vehicle information system according to claim 2, wherein:

the in-vehicle information terminal has a dedicated application provided thereto in advance; and the in-vehicle information system is capable of making a phone call from the in-vehicle information terminal side under a state in which the in-vehicle communication unit of the in-vehicle information terminal and the information terminal communication unit of the portable information terminal are connected to each other while avoiding changing display of the portable information terminal or only performing minimal display by using the dedicated application to input a phone number of a called party.

7. The in-vehicle information system according to claim 1, wherein:

the portable information terminal has a dedicated application provided thereto in advance; and the in-vehicle information system is configured to:

connect, when the dedicated application is activated, the in-vehicle communication unit of the in-vehicle information terminal and the information terminal communication unit of the portable information terminal to each other, and stop a screen display on the second display screen of the touch panel of the portable information terminal to switch the screen display on the second display screen of the touch panel from a normal screen of the portable information terminal to a screen dedicated to a touch input for the in-vehicle information terminal; and finish, when the dedicated application is finished, the connection between the in-vehicle communication unit of the in-vehicle information terminal and the information terminal communication unit of the portable information terminal, and return the screen display on the second display screen of the touch panel of the portable information terminal to an original screen display to switch the screen display on the second display screen of the touch panel from the screen dedicated to the touch input for the in-vehicle information terminal to the normal screen of the portable information terminal.

8. The in-vehicle information system according to claim 7, wherein the in-vehicle information system is further configured to:

display, when the in-vehicle communication unit of the in-vehicle information terminal and the information terminal communication unit of the portable information terminal are connected to each other, a cursor on the first display screen of the first display unit of the in-vehicle information terminal;

display, to a user, a current position pointed on the first display screen of the first display unit by a touch input to the second display screen on the touch panel of the portable information terminal; and move the cursor on the first display screen in response to the touch input to the second display screen on the touch panel of the portable information terminal.

9. The in-vehicle information system according to claim 7, wherein:

the in-vehicle information terminal further comprises a microphone and a speaker; and the in-vehicle information system is further configured to make, when an incoming phone call interrupts under a state in which the in-vehicle communication unit of the in-vehicle information terminal and the information terminal communication unit of the portable information terminal are connected to each other, a phone call on the in-vehicle information terminal side while avoiding changing display of the portable information terminal or only performing minimal display.

10. The in-vehicle information system according to claim 7, wherein:

the in-vehicle information terminal has a dedicated application provided thereto in advance; and the in-vehicle information system is capable of making a phone call from the in-vehicle information terminal side under a state in which the in-vehicle communication unit of the in-vehicle information terminal and the information terminal communication unit of the portable information terminal are connected to each other while avoiding changing display of the portable information terminal or only performing minimal display by using the dedicated application to input a phone number of a called party.

11. The in-vehicle information system according to claim 1, further comprising a holder, and wherein the in-vehicle information system is configured to:

connect, when the portable information terminal is mounted into the holder, the in-vehicle communication unit of the in-vehicle information terminal and the information terminal communication unit of the portable information terminal to each other, and stop a screen display on the second display screen of the touch panel of the portable information terminal to switch the screen display on the second display screen of the touch panel from a normal screen of the portable information terminal to a screen dedicated to a touch input for the in-vehicle information terminal; and finish, when the portable information terminal is detached from the holder, the connection between the in-vehicle communication unit of the in-vehicle information terminal and the information terminal communication unit of the portable information terminal, and return the screen display on the second display screen of the touch panel of the portable information terminal to an original screen display to switch the screen display on the second display screen of the touch panel from the screen dedicated to the touch input for the in-vehicle information terminal to the normal screen of the portable information terminal.

12. The in-vehicle information system according to claim 11, wherein the in-vehicle information system is further configured to:

display, when the in-vehicle communication unit of the in-vehicle information terminal and the information terminal communication unit of the portable information terminal are connected to each other, a cursor on the first display screen of the first display unit of the in-vehicle information terminal;

display, to a user, a current position pointed on the first display screen of the first display unit by a touch input to the second display screen on the touch panel of the portable information terminal; and move the cursor on the first display screen in response to the touch input to the second display screen on the touch panel of the portable information terminal.

13. The in-vehicle information system according to claim 11, wherein:

the in-vehicle information terminal further comprises a microphone and a speaker; and the in-vehicle information system is further configured to make, when an incoming phone call interrupts under a state in which the in-vehicle communication unit of the in-vehicle information terminal and the information terminal communication unit of the portable information terminal are connected to each other, a phone call on the in-vehicle information terminal side while avoiding changing display of the portable information terminal or only performing minimal display.

14. The in-vehicle information system according to claim 1, wherein:

the interface for connecting the in-vehicle communication unit of the in-vehicle information terminal and the information terminal communication unit of the portable information terminal to each other comprises a wired or wireless interface; and the in-vehicle information system is configured to:

display, on the second display screen of the touch panel of the portable information terminal, when the in-vehicle communication unit of the in-vehicle information terminal and the information terminal communication unit of the portable information terminal are connected to each other, a screen dedicated to a touch input in order to switch a mode of a screen display on the second display screen of the touch panel from a normal screen of the portable information terminal to the screen dedicated to the touch input for the in-vehicle information terminal; and return, when the connection between the in-vehicle communication unit of the in-vehicle information terminal and the information terminal communication unit of the portable information terminal is canceled, the screen display on the second display screen of the touch panel of the portable information terminal to an original screen display in order to switch the screen display on the second display screen of the touch panel from the screen dedicated to the touch input for the in-vehicle information terminal, to the normal screen of the portable information terminal.

15. The in-vehicle information system according to claim 14, wherein the in-vehicle information system is further configured to:

display, when the in-vehicle communication unit of the in-vehicle information terminal and the information terminal communication unit of the portable information terminal are connected to each other, a cursor on the first display screen of the first display unit of the in-vehicle information terminal;

display, to a user, a current position pointed on the first display screen of the first display unit by a touch input to the second display screen on the touch panel of the portable information terminal; and move the cursor on the first display screen in response to the touch input to the second display screen on the touch panel of the portable information terminal.

16. The in-vehicle information system according to claim 14, wherein:

the in-vehicle information terminal further comprises a microphone and a speaker; and the in-vehicle information system is further configured to make, when an incoming phone call interrupts under a state in which the in-vehicle communication unit of the in-vehicle information terminal and the information terminal communication unit of the portable information terminal are connected to each other, a phone call on the in-vehicle information terminal side while avoiding changing display of the portable information terminal or only performing minimal display.

17. The in-vehicle information system according to claim 1, wherein:

the in-vehicle information terminal further comprises a microphone and a speaker; and the in-vehicle information system is further configured to make, when an incoming phone call interrupts under a state in which the in-vehicle communication unit of the in-vehicle information terminal and the information terminal communication unit of the portable information terminal are connected to each other, a phone call on the in-vehicle information terminal side while avoiding changing display of the portable information terminal or only performing minimal display.

18. The in-vehicle information system according to claim 1, wherein:

the in-vehicle information terminal has a dedicated application provided thereto in advance; and the in-vehicle information system is capable of making a phone call from the in-vehicle information terminal side under a state in which the in-vehicle communication unit of the in-vehicle information terminal and the information terminal communication unit of the portable information terminal are connected to each other while avoiding changing display of the portable information terminal or only performing minimal display by using the dedicated application to input a phone number of a called party.

19. The in-vehicle information system according to claim 1, wherein:
the portable information terminal has a dedicated application provided thereto in advance; and
the in-vehicle information system is configured to:
connect, when the dedicated application is activated, the in-vehicle communication unit of the in-vehicle information terminal and the information terminal communication unit of the portable information terminal to each other, and display, on the second display screen of the touch panel of the portable information terminal, a screen dedicated to a touch input in order to switch a screen display on the second display screen of the touch panel from a normal screen to the screen dedicated to the touch input for the in-vehicle information terminal; and
finish, when the dedicated application is finished, the connection between the in-vehicle communication unit of the in-vehicle information terminal and the information terminal communication unit of the portable information terminal, and return the screen display on the second display screen of the touch panel of the portable information terminal to an original screen display in order to switch the screen display on the second display screen of the touch panel from the screen dedicated to the touch input for the in-vehicle information terminal, to the normal screen of the portable information terminal.

20. The in-vehicle information system according to claim 1, further comprising a holder, and
wherein the in-vehicle information system is configured to:
connect, the portable information terminal is mounted into the holder, the in-vehicle communication unit of the in-vehicle information terminal and the information terminal communication unit of the portable information terminal to each other, and display, on the second display screen of the touch panel of the portable information terminal, a screen dedicated to a touch input in order to switch a screen display on the second display screen of the touch panel from a normal screen of the portable information terminal to the screen dedicated to the touch input for the in-vehicle information terminal; and
finish, when the portable information terminal is detached from the holder, the connection between the in-vehicle communication unit of the in-vehicle information terminal and the information terminal communication unit of the portable information terminal, and return the screen display on the second display screen of the touch panel of the portable information terminal to an original screen display in order to switch the screen display on the second display screen of the touch panel from the screen dedicated to the touch input for the in-vehicle information terminal to the normal screen of the portable information terminal.

* * * * *